US011500345B2

(12) United States Patent
Mattioli

(10) Patent No.: US 11,500,345 B2
(45) Date of Patent: Nov. 15, 2022

(54) ELECTRICAL CONTROL SYSTEM, IN PARTICULAR FOR HOME AUTOMATION SYSTEMS

(71) Applicant: HIKE S.R.L., Milan (IT)

(72) Inventor: Riccardo Alberto Mattioli, San Pietro in Casale (IT)

(73) Assignee: HIKE S.R.L., Milan (IT)

( * ) Notice: Subject to any disclaimer, the term of this patent is extended or adjusted under 35 U.S.C. 154(b) by 388 days.

(21) Appl. No.: 16/616,739

(22) PCT Filed: May 25, 2018

(86) PCT No.: PCT/IB2018/053729
§ 371 (c)(1),
(2) Date: Nov. 25, 2019

(87) PCT Pub. No.: WO2018/215980
PCT Pub. Date: Nov. 29, 2018

(65) Prior Publication Data
US 2020/0201270 A1   Jun. 25, 2020

(30) Foreign Application Priority Data

May 26, 2017   (IT) .................... 102017000057527

(51) Int. Cl.
*G05B 15/02*   (2006.01)
*H01H 9/02*   (2006.01)
(Continued)

(52) U.S. Cl.
CPC ............. *G05B 15/02* (2013.01); *G06V 40/13* (2022.01); *H01H 9/02* (2013.01); *H02G 3/12* (2013.01);
(Continued)

(58) Field of Classification Search
CPC .......... G05B 15/02; G06V 40/13; H01H 9/02; H02G 3/12; H02G 3/16
(Continued)

(56) References Cited

U.S. PATENT DOCUMENTS 5,706,191 A  *  1/1998  Bassett .............. G05D 23/1917
700/9
7,092,772 B2 *  8/2006  Murray .................. G09B 25/00
700/274
(Continued)

OTHER PUBLICATIONS

International Search Report for International Patent Application No. PCT/IB2018/053729, dated Nov. 7, 2018, 4 pages.
(Continued)

*Primary Examiner* — Md Azad
(74) *Attorney, Agent, or Firm* — Armstrong Teasdale LLP

(57) ABSTRACT

An electrical control system, in particular for home automation systems, includes at least one electronic switching device including a switching module (10) which includes
a switching circuit, including at least one controlled switch which allows a selective implementation of a switch configuration, a diverter configuration or an inverter configuration and
a plurality of terminals which allow the connection of the switching module to an external electrical system.
The switching module allows selective application of the switch configuration of the switching circuit or diverter configuration of the switching circuit or inverter configuration of the switching circuit to terminals in a partial way, or total way, or to implement a total separation to said terminals.

19 Claims, 9 Drawing Sheets

(51) Int. Cl.
*H02G 3/12* (2006.01)
*H02G 3/16* (2006.01)
*H04L 12/28* (2006.01)
*G06V 40/13* (2022.01)

(52) U.S. Cl.
CPC ........... *H02G 3/16* (2013.01); *H04L 12/2838* (2013.01); *H01H 2300/03* (2013.01)

(58) Field of Classification Search
USPC .......................................................... 700/282
See application file for complete search history.

(56) References Cited

U.S. PATENT DOCUMENTS

| | | | |
|---|---|---|---|
| 2004/0267385 A1* | 12/2004 | Lingemann | G05B 15/02 700/83 |
| 2011/0141647 A1 | 6/2011 | Garcia et al. | |
| 2012/0262006 A1* | 10/2012 | Elberbaum | H02G 3/12 307/112 |
| 2015/0276239 A1 | 10/2015 | Fadell et al. | |
| 2016/0054717 A1* | 2/2016 | Elberbaum | H02G 3/18 700/275 |
| 2016/0077530 A1* | 3/2016 | Moran | F16K 31/02 700/282 |
| 2016/0327921 A1* | 11/2016 | Ribbich | H05B 47/105 |
| 2017/0108236 A1 | 4/2017 | Guan et al. | |
| 2018/0041031 A1* | 2/2018 | Lo Conte | H02J 3/14 |
| 2018/0076663 A1* | 3/2018 | Gudgel | H02J 7/35 |

OTHER PUBLICATIONS

Written Opinion of the ISA for International Patent Application No. PCT/IB2018/053729, dated Nov. 7, 2018, 8 pages.

* cited by examiner

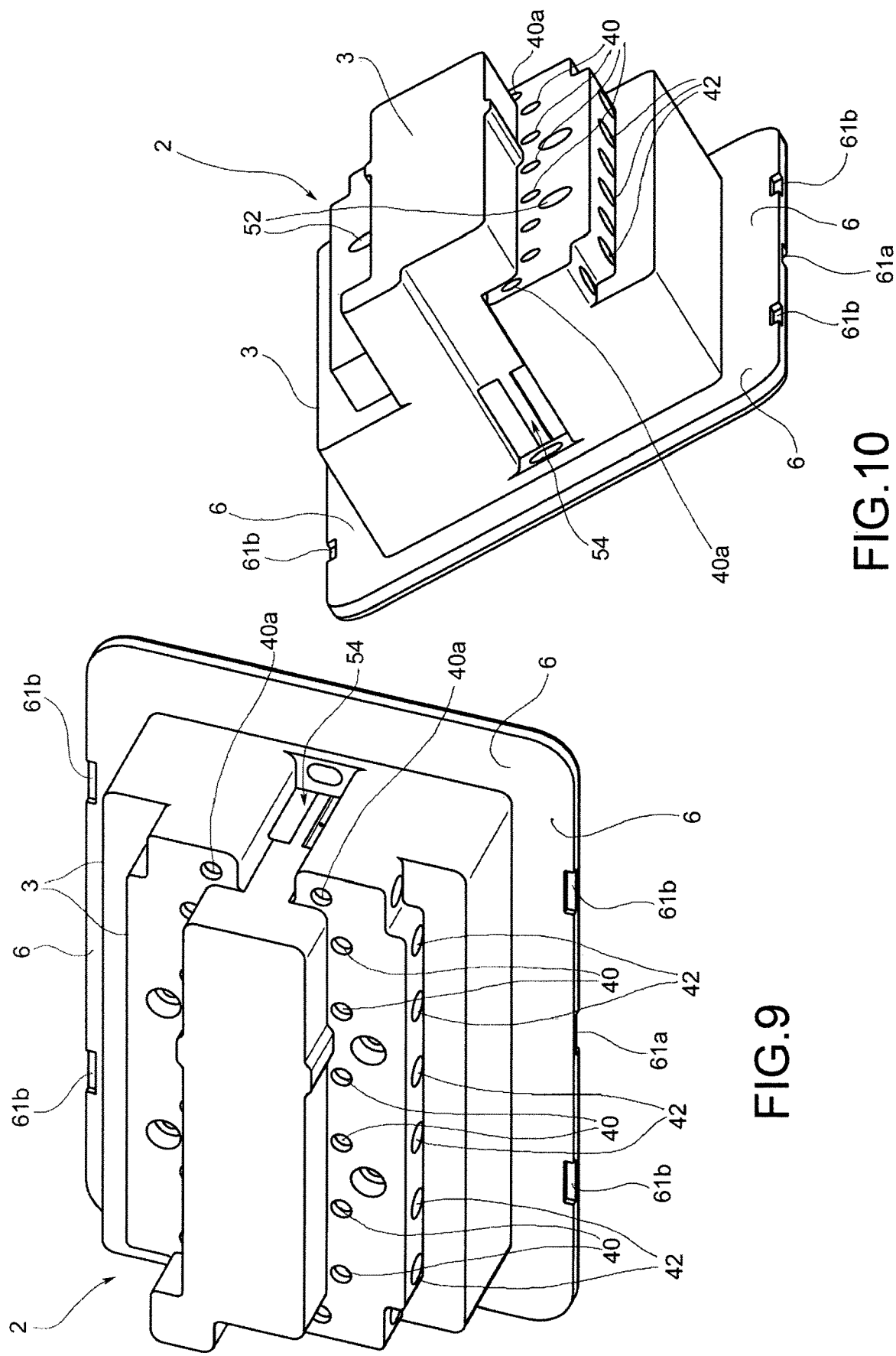

ELECTRICAL CONTROL SYSTEM, IN PARTICULAR FOR HOME AUTOMATION SYSTEMS

CROSS-REFERENCE TO RELATED APPLICATIONS

This application is a National Stage Application of International Patent Application No. PCT/IB2018/053729 having an international filing date of May 25, 2018, which claims the benefit of priority to Italian Patent Application No. 102017000057527, filed May 26, 2017, the entire contents of which are hereby incorporated by reference herein.

FIELD OF THE INVENTION

The present invention relates to an electrical control system, in particular for home automation systems.

BACKGROUND OF THE INVENTION

Recent developments in home automation have made it possible to improve the quality of life in residential and work environments. The adoption of home automation systems has allowed in particular to improve security, simplify the design, installation, maintenance and use of technologies and reduce management costs.

Home automation has made it possible in particular to make environment equipment, systems and devices "intelligent". An "intelligent" building, with the support of new technologies, allows coordinated, integrated and computerized management of technological systems (such as air conditioning, water, gas and energy distribution, security systems . . . ), computer and communication networks, improving management flexibility, comfort and safety and ultimately the quality of life and work in buildings.

An "intelligent" environment, for example a house, can be controlled by a user through appropriate user interfaces, such as buttons or keys, remote controls, speech recognition systems, etc., which make contact with an intelligent control system.

The various components of such a system are connected to each other and to the control system by various types of interconnection, for example in a local network, or by radio waves or dedicated buses, etc.

Current home automation systems typically have distributed architectures and require hardware connections for communication between the various elements that make up the system. Communication can take place for example according to the KONNEX (KNX) standard, or with Controller Area Network (CAN) systems, RS485, Internet Protocol (IP) network connections, etc. Two or three wire connections, or shielded cables, are also used, with high costs and considerable installation times.

SUMMARY OF THE INVENTION

An object of the present invention is to propose an electrical control system, usable in particular in domotic systems, which allows transforming distributed home automation systems into integrated systems.

The above and other objects and advantages are achieved, according to an aspect of the present invention, by an electrical system having the features described and claimed herein. Preferred embodiments of the invention are also described.

Conveniently, the aforementioned electrical control system can include a plurality of electronic devices, which contain, for example, environmental sensors. In this way, it is possible to create an autonomous system capable of controlling, for example, temperature, humidity and brightness to other magnitudes, controlling other devices, such as a boiler and an air conditioner.

According to a further feature, the electronic devices of the control system can include sensors for detecting the light in the various spectra, implementing an autonomous alarm system by sending, for example, signals containing a generic protocol or the Internet protocol to other electronic devices.

BRIEF DESCRIPTION OF THE DRAWINGS

Further features and advantages of the invention will become apparent from the detailed description that follows, provided purely by way of non-limiting example with reference to the accompanying drawings, in which:

FIGS. 9 and 10 are rear perspective views of the support body of the electric device;

DETAILED DESCRIPTION

Figure 1:
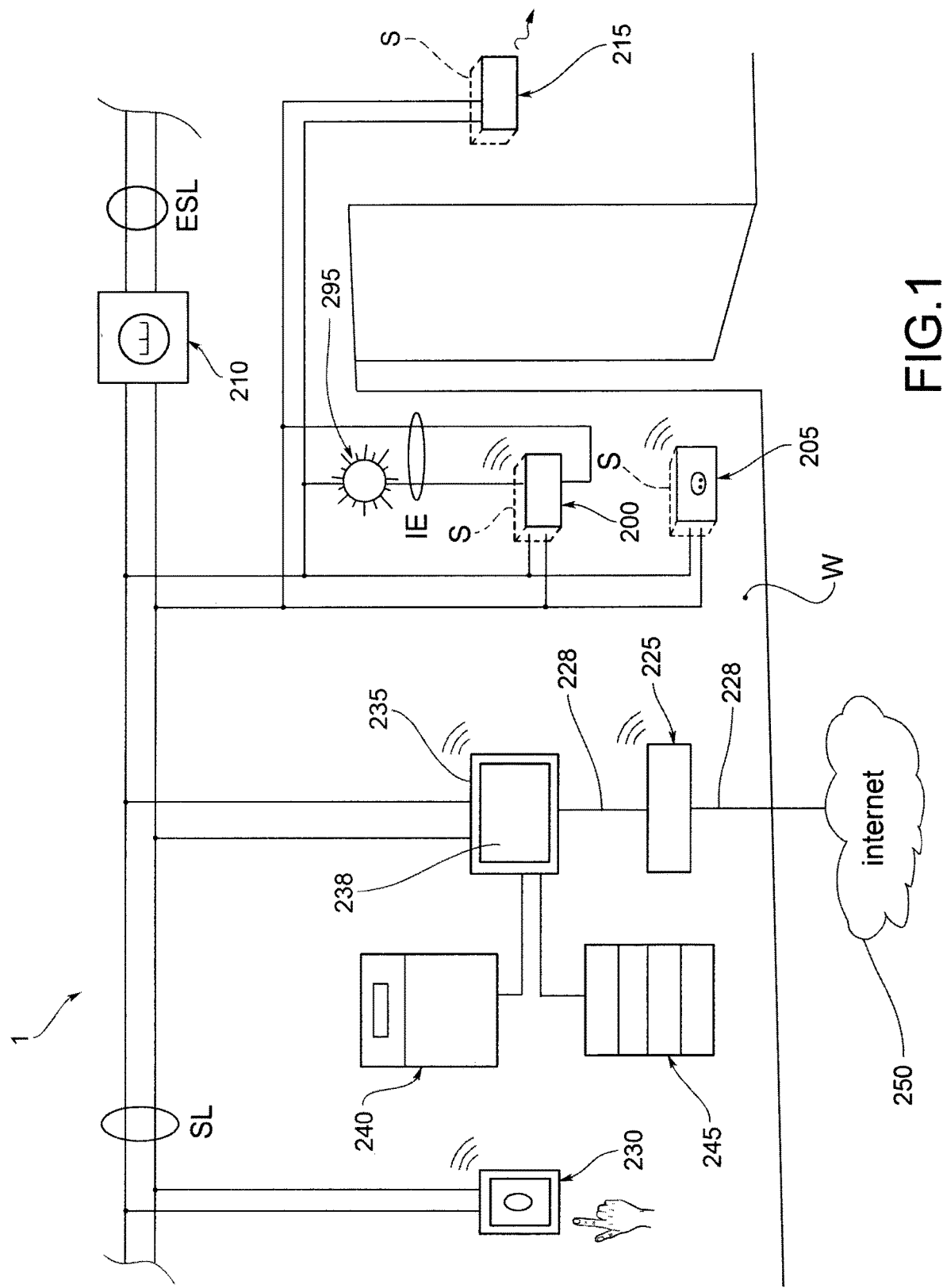
FIG. 1 shows an electrical system according to the present invention, when placed on a wall of a domestic environment.

Before explaining a plurality of embodiments of the invention in detail, it should be noted that the invention is not limited in its application to the construction details and to the configuration of the components presented in the following description or shown in the drawings. The invention can take other embodiments and be implemented or practically carried out in different ways. It should also be understood that the phraseology and terminology are for descriptive purpose and are not to be construed as limiting. The use of "include" and "comprise" and variations thereof are intended as including the elements cited thereafter and their equivalents, as well as additional elements and equivalents thereof.

With reference initially to FIG. 1, reference numeral 1 indicates as a whole an electrical control system according to the present invention.

Figure 3:
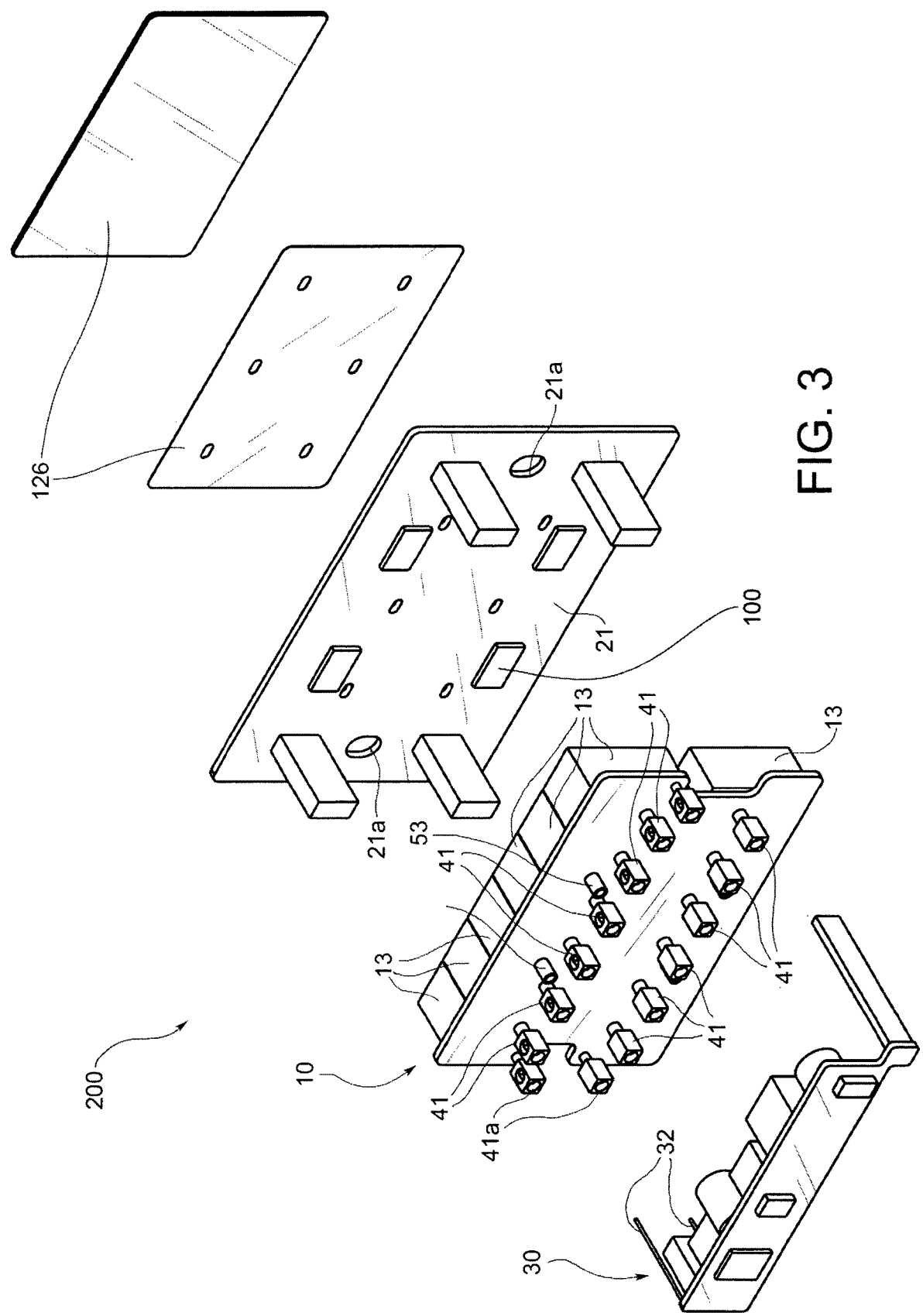
FIG. 3 is a partially exploded representation of an electric device which implements the electrical control system.

In the exemplary embodiment shown, the electrical control system 1, particularly for home automation systems, comprises at least one electronic switching device 200 which includes a switching module 10 (see FIG. 3).

The switching module 10 comprises at least one switching circuit 80 comprising at least one controlled switch 13, arranged to allow a selective implementation of a switch configuration or a diverter configuration or an inverter configuration, and a plurality of terminals 81, 82, 83, 84 arranged to allow the connection of said switching circuit 80 to an external electrical system IE.

As will be better described below, the switching module 10 allows the selective application of the switch configuration of the switching circuit 80, or diverter configuration of the switching circuit 80, or inverter configuration of the switching circuit 80 to terminals 81, 82, 83, 84, in a partial, or total way, or so that a total separation is achieved to said terminals 81, 82, 83, 84.

In other words, with a total separation to said terminals 81, 82, 83, 84, it is as if the terminals 81, 82, 83, 84 were separated from said switching circuit 80.

By way of explanation, when said switch configuration (2-way switch), or diverter configuration (3-way switch), or inverter configuration (4-way switch) of the switching circuit 80 is applied to terminals 81, 82, 83, 84, in a partial way, or so that a total separation is achieved at said terminals 81, 82, 83, 84, it is possible to allow the isolation of any device which is connected to at least one of said terminals, for example a light bulb, from the external electrical system IE connected to at least one other terminal. By virtue of this it will be possible to work safely on such device, for example when removing said light bulb, being certain that said device is not connected to said external electrical system IE.

Figure 12:
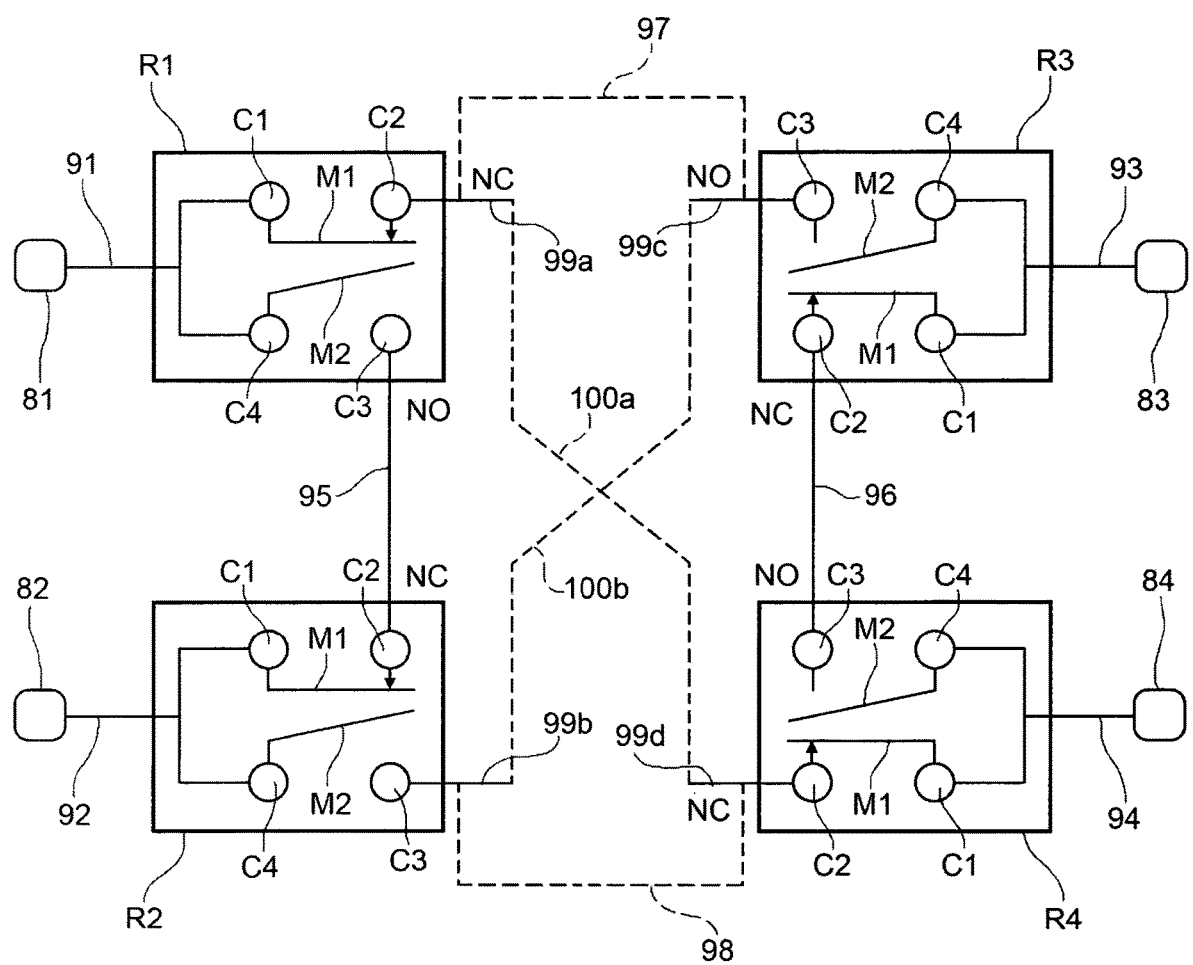
FIG. 12 is a circuit diagram illustrating one embodiment of a switching circuit.

Referring to FIG. 12, by full application of the switch configuration it is meant, for example, that the switch configuration is implemented between terminals 81 and 83 and terminals 82 and 84. By partial application of the switch configuration it is meant, for example, that the switch configuration is implemented between terminals 81 and 83, whereas the switch configuration is not implemented between terminals 82 and 84 and they are separated from each other.

On the other hand, by full application of the diverter configuration it is meant, for example, that the diverter configuration is implemented between the terminals 81, 83 and 84. By partial application of the diverter configuration it is meant, for example, that the switch configuration is implemented between terminals 81 and 83 while terminal 84 is isolated.

By application of the total separation of the diverter configuration it is meant, for example, that between the terminals 81, 83 and 84 there is no type of connection, therefore the terminals are separated from the internal configuration of the switch.

On the other hand, by full application of the inverter configuration it is meant for example that the inverter configuration is implemented between the terminals 81, 81, 83 and 84. By partial application of the inverter configuration it is meant, for example, that the switch configuration is implemented between terminals 81 and 83 or that the diverter configuration is applied between terminals 81, 83 and 84. By application of the total separation of the inverter configuration it is meant, for example, that between the terminals 81, 82, 83 and 84 there is no type of connection, therefore the terminals are separated from the internal configuration of the switch.

It is therefore evident that terminals 81, 82, 83 and 84 can be independent from each other. There is therefore no fixed connection, non-modifiable, between two terminals inside the switch which joins at least two of said terminals, since it would not be possible to implement any previously described configuration.

In order to allow the application of the aforesaid configurations, the switching circuit 80, or each switching circuit 80 in the case of a plurality of switching circuits 80, for example, comprises controlled switches R1, R2, R3, R4, indicated with reference numeral 13, which are conveniently connected according to a scheme adapted to allow the selective implementation of a switch configuration, or of a diverter configuration, or of an inverter configuration (FIG. 12), and this configuration is applied to the connection terminals 81, 82, 83, 84 to an external electrical system IE partially, totally or completely separately, thus implementing a galvanic isolation between the external electrical system IE and the switching circuit 80.

Figure 11:
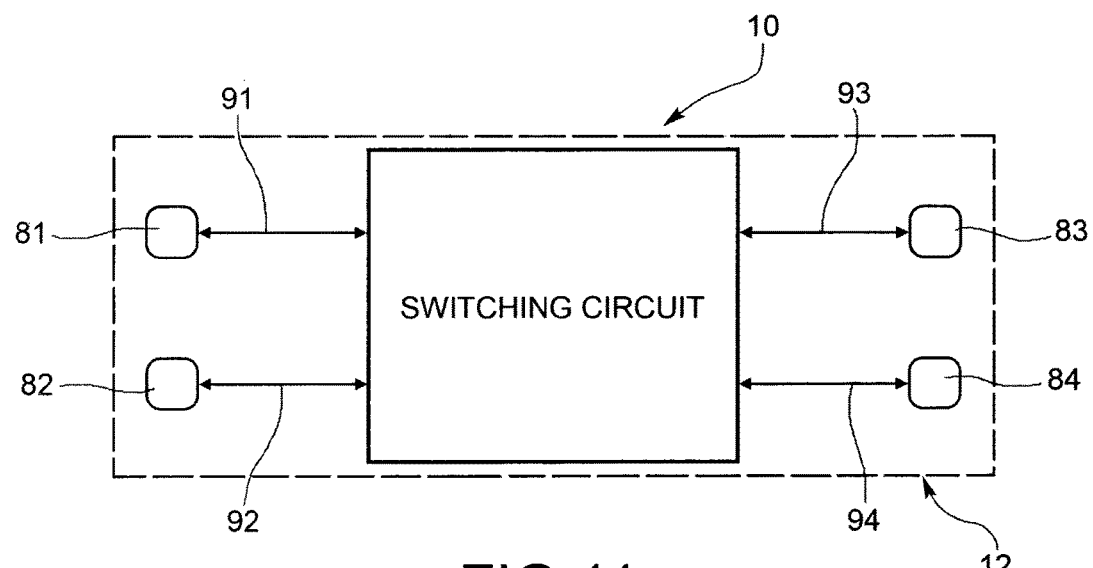
FIG. 11 is a block diagram representing the switching circuit included in a device according to the present invention.

By way of a non-limiting example, in the embodiment illustrated in FIGS. 11 and 12, said scheme may comprise four relays R1, R2, R3 and R4 of the three-terminal type. Each of these relays can comprise four fixed contacts C1, C2, C3, C4 and two movable contacts M1 and M2 at its interior.

The fixed contacts C1 and C4 are connected to each other within the respective relay.

The movable contact M1 is normally closed on the fixed contact C2 and the movable contact M2 is normally open with respect to the fixed contact C3.

The fixed contacts C2 of the relays R2 and R3 are connected to the fixed contacts C3 of the relays R1 and R4 through two connections or tracks 95 and 96.

The fixed contacts C2 of the R1 and R4 relays are connected to respective terminals 99*a* and 99*d* arranged on the board 11, and the fixed contacts C3 of the relays R2 and R3 are connected to respective terminals 99*b* and 99*c* also arranged on the board 11.

The terminal 99*a* can be connected to the terminal 99*c* or to the terminal 99*d* by conductive bridges (or the like) 97 and 100*a*, and the terminal 99*b* can be connected to the terminal 99*d* or to the terminal 99*c* by conductive bridges (or the like) 98 and 100*b*.

The scheme described above with reference to FIG. 12 may allow the selective implementation of a simple switch configuration, or a diverter configuration, or an inverter configuration.

The possibility of implementing a system that can partially, totally apply or isolate any configuration of the switching circuit 80 from the terminals 81, 82, 83, 84 can be achieved having an internal pair of contacts indicated with C2 and C3 in FIG. 12 available.

The switching circuit 80, or each switching circuit 80 in the case of a plurality of switching circuits 80, can be activated/deactivated, or connected/disconnected manually or automatically.

The at least one electronic switching device 200 can be recessed in a seat S arranged in a boundary wall W of an environment. In this seat S, an electrical power supply line SL extends.

Figure 2:
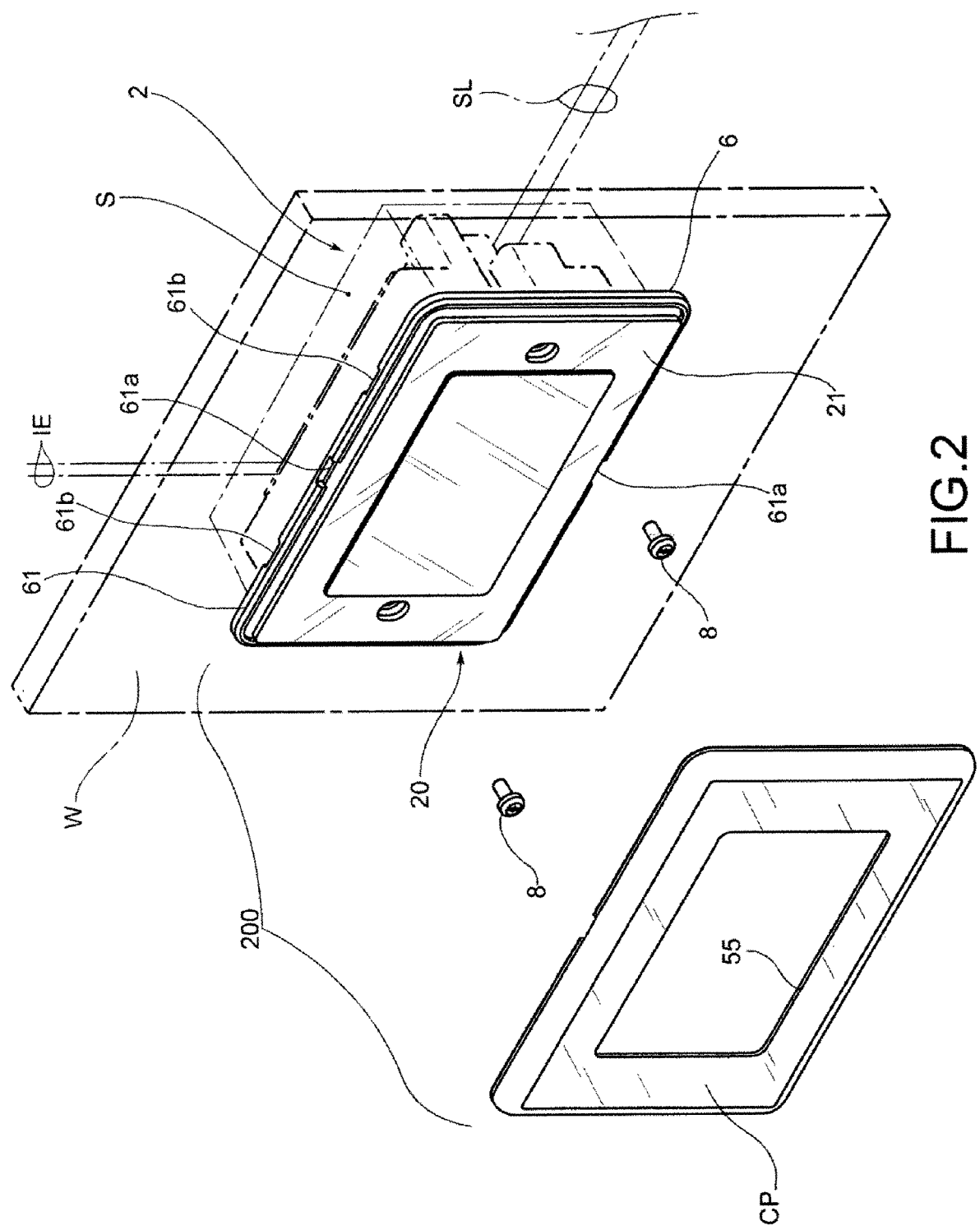
FIG. 2 is a partially exploded representation where an electric device is shown fixed in a seat arranged in a wall.

The electrical power supply line SL may be a multi-wire power supply line, schematically shown in FIGS. 1 and 2. Such electrical power supply line SL can, by way of example, be a high-voltage line (for example, 240 VAC, 50 or 60 Hz).

In the embodiment illustrated by way of example, the electronic switching device 200 comprises a supporting hollow body indicated as a whole with 2. This supporting body 2 can be made of an electrically insulating material, for example a molded plastic material, and be designed to be recessed in a seat S (FIG. 2) arranged in a boundary wall W of an environment.

Moreover, the supporting body 2 comprises a containing portion 3, in the form of a tub, defining a cavity 4 having a front opening 5 which in use extends in a plane essentially parallel to the wall W, near the front surface of such a wall.

As will be clearer hereinafter, conductors of the electrical power supply line SL extend inside the cavity 4 of the supporting body, through through holes 40*a* provided in the wall of the containing portion 3 of the supporting body 2, while the conductors of the external electrical system IE also extend inside the cavity 4 of the supporting body, through through holes 40 provided in the wall of the containing portion 3 of the supporting body 2 (FIGS. 9 and 10).

In the electronic switching device 200 a plurality of connectors can be provided, for example screw clamps 41 (see in particular FIG. 3), with the respective inlet openings facing the through holes 40, to allow the introduction of high voltage cables which can then be tightened by acting on the screws of said clamps 41 by means of a screwdriver or the like, introduced through corresponding through openings 42 (FIGS. 9 and 10) provided in the wall of portion 3 of the supporting body 2.

Figure 4:
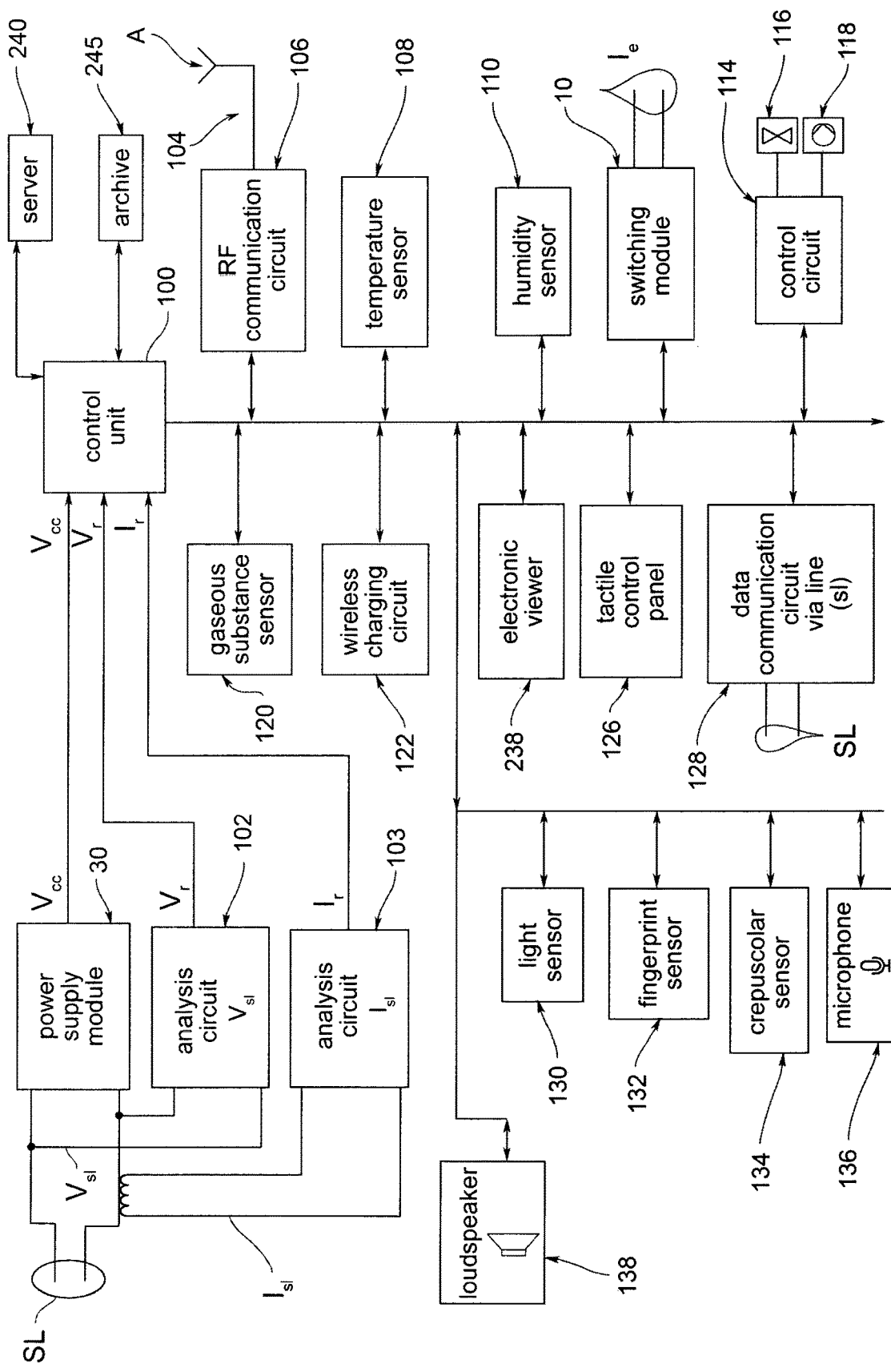
FIG. 4 shows an exemplary block diagram of the internal structure of an electric device.

In an exemplary embodiment, the electronic switching device 200 of control can comprise a voltage supply module 30 (FIG. 4) which has a pair of terminals 32 connected to screw clamps, indicated with 41*a* in FIG. 3, whose tightening screws are accessible through through openings 40*a* of the containing portion 3 of the supporting body 2 (FIGS. 9 and 10). Through the terminals 32, the power supply module receives an alternating input voltage from electrical power supply line SL, from which, in a per se known manner, it obtains one or more continuous supply voltages for other devices and components of the electronic switching device 200.

In the embodiment illustrated by way of example, the circuit plate 21, in the outermost band of the latter, a pair of through holes 21*a* are formed. Such through holes 21*a* being adapted to allow the passage of a pair of fixing screws 8 (see in particular FIG. 2) adapted to allow the entire electronic switching device 200 to be secured.

Figure 5:
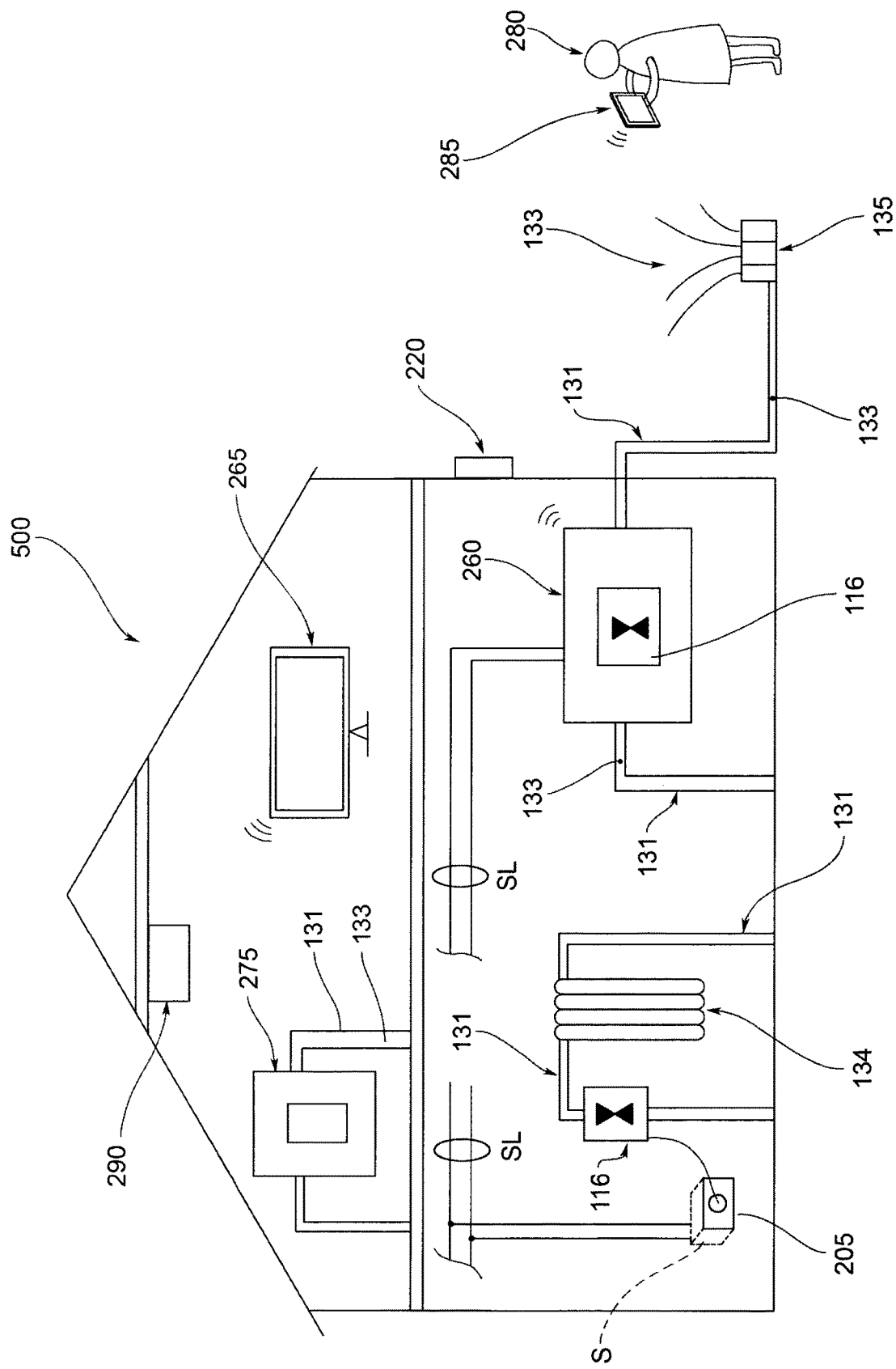
FIG. 5 shows, by way of an example, a house in which some electronic devices and a power supply line are installed.
Figure 6:
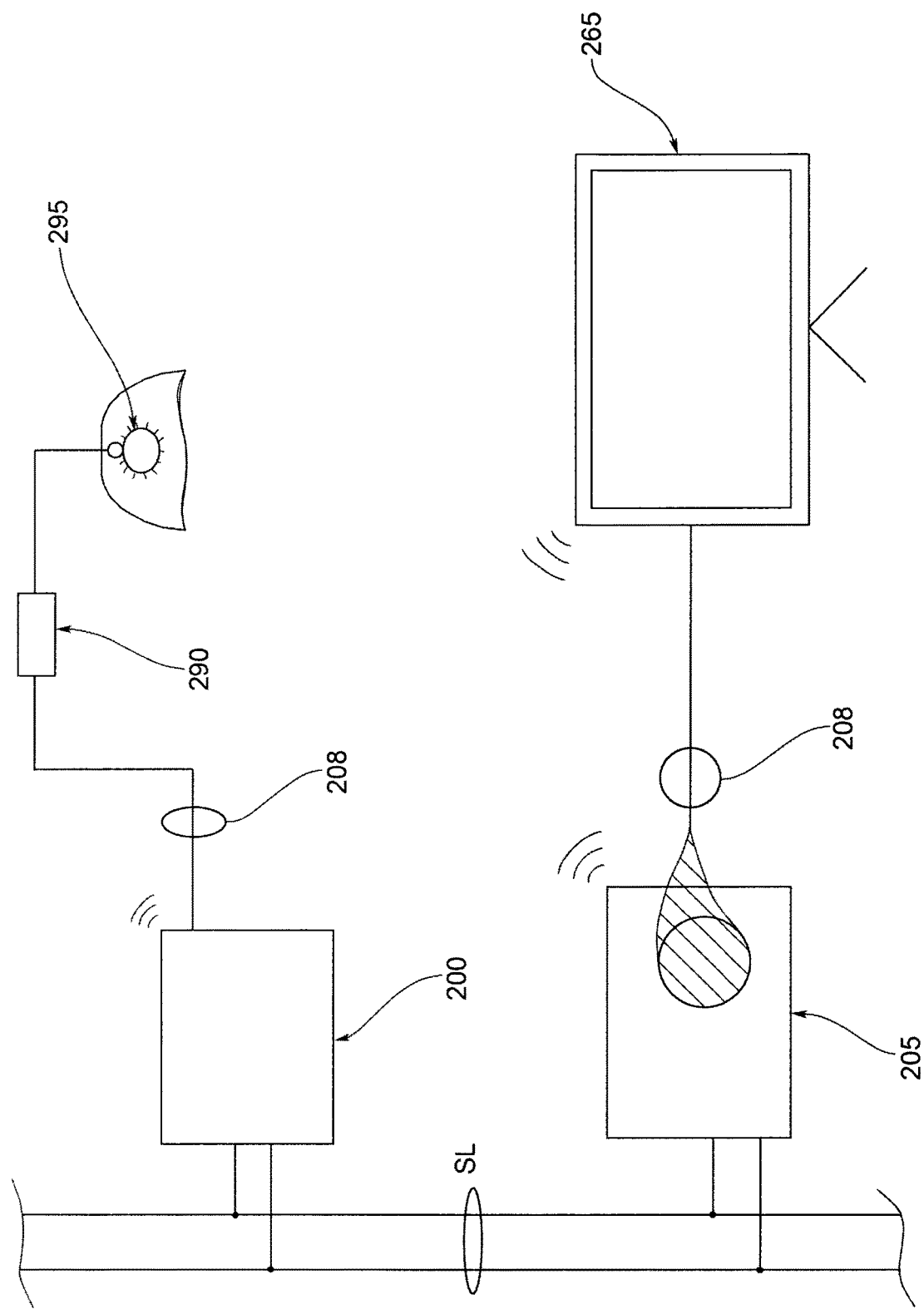
FIG. 6 shows in general a possible communication interaction between the electronic devices or household appliances.

With reference in particular to FIG. 5, the stems of the screws 8 protrude posteriorly beyond the frame flange 6 into recesses 54 (FIGS. 9 and 10), where they are capable of engaging with corresponding nut-screws or the like provided in the seat S made in the wall W, for making the entire electronic switching device 200 secured to said seat S and thus to the wall W. Said nut-screws or the like can be incorporated in a recessed box, for example of the types marketed with the abbreviations 503E and 504E by the company BTicino S.p.A.

The supporting body 2 not only acts as a static container for the devices of the electrical device 1, but is also a functional container in which, as will be described below, the reference planes for the optimal positioning of the circuit boards and for the electrical insulation of the various components are implemented.

A profile or edge 61 of the flange 6 can conveniently have, at the back, some recess seats 61*b* for engaging corresponding coupling members of a cover plate of a type known per se, such as that indicated by CP in FIG. 5. In the illustrated embodiment, the plate CP has a large opening or window 55, through which in use a user can easily access the control panel of the electronic switching device 200 with his hand.

The interruptions or notches 61*a* of the edge 61 of the flange 6 allow the engagement of a tool for decoupling and removing the plate CP, when necessary.

In a further exemplary embodiment, with reference in particular to FIG. 1, the electrical system 1 can further comprise a general switch 210 placed at the entrance of the house 500 in which the environment or environments where the whole system is developed are located. In addition to complying with current regulations, this general switch allows power to be disconnected from the electrical system 1 to carry out modifications, repairs, extensions and checks in general.

The switch 210 for electrical separation is arranged to allow the separation of said electrical power supply line SL from said external electrical power supply line ESL in a manual or automatic mode.

In order to have total control, the electrical system 1 also has to be able to manage the individual power supplies arranged in the environment(s) in which it is located. Therefore, the electrical system 1 may comprise an electronic device 205 for electrical connection, for example intended to be fixed in a recessed seat S arranged in a boundary wall W of an environment; in which the electrical power supply line SL extends. The electronic device 205 for electrical connection is arranged to allow the installation of a generic electrical outlet and comprises at least one controlled switch 13 arranged to allow an electrical connection between said electrical power supply line SL and a conductor of said electrical outlet.

As will be seen below, the electronic device 205 also provides an important remote control solution, allowing the management of generic appliances connected to the control system 1 and a direct control on energy consumption.

With reference in particular to FIG. 5, the electrical control system 1 may further comprise an electromechanical device 260 comprising a solenoid valve 116, or an electric pump 118, which is controlled by a control circuit 114 or directly by said electrical power supply line SL.

The electromechanical device 260 is arranged to allow the passage of a fluid 133 through a conduit 131. Therefore, the control system 1 can allow the possibility to manage the environmental parameters such as temperature, humidity, brightness, etc. . . . controlling directly any boilers 275 or the electromechanical device 260, through the use of sensors distributed in the various electric devices that make up the electrical system 1, such as a temperature, humidity, natural or harmful gas sensor such as $CO_x$ gases, or light level control, etc. . . .

It is clear, for example, that the control system 1, by means of a crepuscular sensor 134, can at predetermined times activate an irrigation system 135, allowing the fluid 133, for example water, to pass through a conduit 131 dedicated to irrigate a garden.

The electrical control system 1 can further comprise an electronic sound device 220 which includes a microphone 136 or a loudspeaker 138. In this way it is possible to create a sound diffusion system inside the house 500, and a door entry system directly integrated into the electrical control system 1 outside the house 500.

It is clear that the electrical system 1, being innovative, also has the possibility of charging other electronic devices, such as mobile phones, by means of remote charging. Thus, the electrical control system 1 can further comprise an electronic energy transfer device 215, including an electric circuit 122 for energy transfer using air as a means of transport.

It is clear that this electronic energy transfer device 215, by means of the already known transmission techniques, can also supply separate objects such as locks, thus obviating the already known existing wiring problems.

With reference in particular to FIG. 1, the electrical control system 1 can further comprise an electronic fingerprint detection device 230, including a sensor 132 arranged for the detection of fingerprints. This detection is particularly useful where one wants to achieve privileged access to enclosed spaces or even as access to security devices such as safes.

Of course, the electrical control system 1 may include an electric control device 235, including a viewing system 238 arranged to allow a user to control or manage the electrical control system 1, furthermore the viewing system 238 may include a tactile control panel 126 of the capacitive or inductive or mechanical type.

In this way, it is possible to know the status of the system, set any values, etc . . . , even if these functions can be performed by a user 280 who uses a device 285 such as a mobile phone etc. . . . remotely, using radio frequency broadcasts as a connection.

It is therefore clear that the system can also manage a centralized alarm through the use of various sensors distributed in the various electronic devices that make up the electrical system 1. Therefore, the electrical control system 1, in any of said electronic devices 200, 205, 215, 220, 230, 235, or in the electromechanical device 260, may comprise a sensor 130 for detecting light in the visible spectrum or in the ultraviolet spectrum or in the infrared spectrum.

For example, the sensor 130 may be at least one image sensor, a sensor for detecting light in the ultraviolet spectrum or even in the infrared spectrum.

This sensor can allow implementing a whole series of integrated devices for direct or night vision that allow the vision or even evidently the control of all the environments remotely.

It is clear that all the electronic devices that make up the electrical system 1 can have data entry, control, etc. systems, either mechanical, such as traditional keys, or electronic, such as tactile capacitive, inductive sensors, etc. . . .

It is therefore clear that since the electrical system 1 is integrated, thus using the existing electrical systems, it has to be able to power and control its electronic devices, integrating a power supply therein that picks up the electric power from the electrical power supply line SL and has at least one direct voltage output.

Any one of the preceding electronic devices 200, 205, 215, 220, 230, 235, or the electromechanical device 260, may include a sensor 108 for sensing the ambient temperature or a sensor 110 for sensing environmental humidity or a sensor 120 for sensing at least one gaseous substance.

Moreover, the electrical control system 1, in any of the electronic devices 200, 205, 215, 220, 230, 235, or in the electromechanical device 260, connected to said electrical supply line SL or external electrical power supply line ESL, can include a control unit 100 arranged to control the operation of each individual device or to monitor the operation of the electrical control system 1 and a voltage monitoring circuit 102 arranged to detect the trend of a voltage Vs1 of the electrical power supply line SL or external electrical power supply line ESL at the zero crossing point. The voltage monitoring circuit 102 can generate a signal Vr towards the control unit 100.

As an alternative to the voltage monitoring circuit 102, any of said electronic devices 200, 205, 215, 220, 230, 235 or the electromechanical apparatus 260 connected to said electrical power supply line SL or ESL, may include a current monitoring circuit 103 arranged to detect the passage of the current Is1 of the electrical power supply line SL or external electrical power supply line ESL at the zero crossing point. The current monitoring circuit 103 is designed to generate a signal Ir towards the control unit 100.

Figure 7:
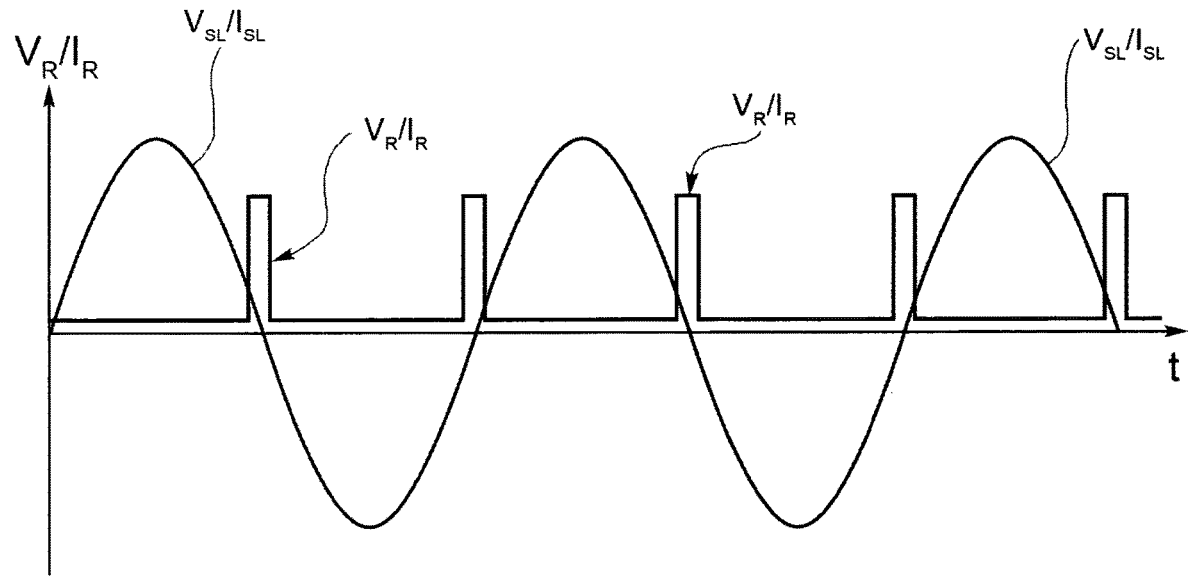
FIGS. 7 and 8 are diagrams qualitatively illustrating waveforms for power control.
Figure 8:
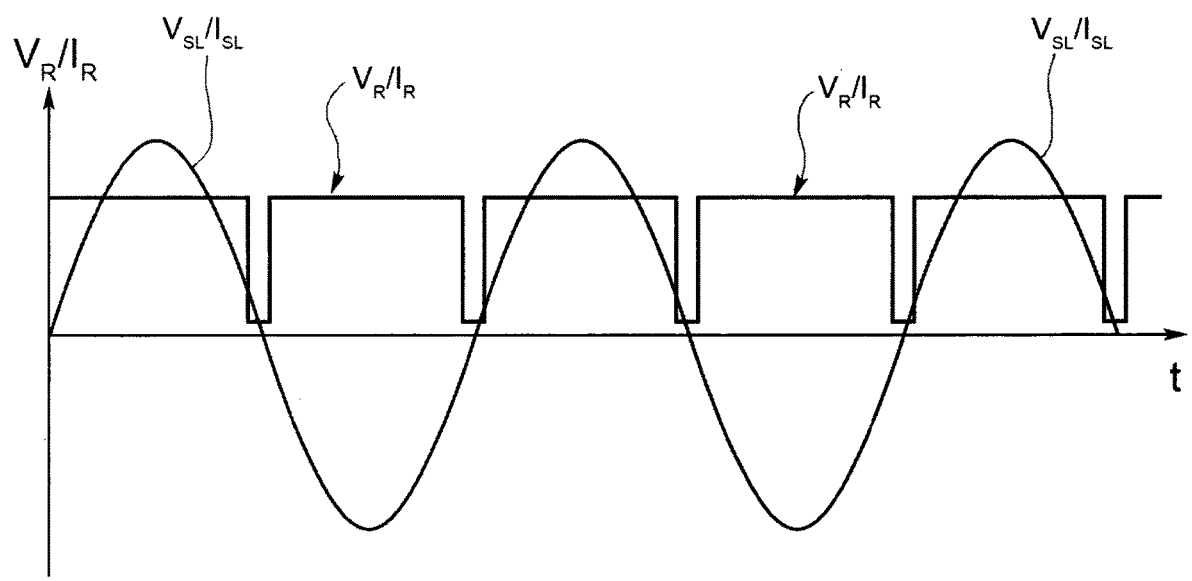

The signals Ir and Vr can, for example, have current/voltage pulses respectively at the passages of the current Is1 at the zero crossing point and the passages of the voltage Vs1 at the zero crossing point (see in particular FIG. 7). Alternatively, the signals Ir and Vr can, for example, have current/voltage holes, respectively, at the passages of the current Is1 at the zero crossing point and of the voltage Vs1 at the zero crossing point (Is1=0A, Vs1=0V), see in particular FIG. 8.

In this way, the control unit, for example by monitoring the frequency of the signals Ir or Vr, can determine the presence and the correctness of the signals Is1 and Vs1, and act immediately accordingly to control for example any relays present in the electric device 200.

Moreover, any of the electronic devices 200, 205, 215, 220, 230, 235 or the electromechanical device 260 may include a power supply module 30 comprising an input 32 intended to be connected to the electrical power supply line SL or external electrical power supply line ESL and having at least one direct voltage output VCC.

In addition, any of the electronic devices 200, 205, 215, 220, 230, 235 or the electromechanical device 260 may include a data communication circuit 128 which is arranged to transmit or receive data through said electrical power supply line SL or external electrical power supply line ESL. Alternatively, it can transmit or receive data via a communication module 104, including a communication circuit 106, arranged to transmit or receive radio frequency signals via an antenna A.

Any of the electronic devices 200, 205, 215, 220, 230, 235 or the electromechanical device 260 may be connected to a data transfer network 250 directly or via a generic electric data connection device 225, by using as a connection means 228 at least one conductive cable or at least one optic fiber or a communication circuit 106 arranged to transmit or receive radio frequency signals via an antenna A.

Any of the electronic devices 200, 205, 215, 220, 230, 235 or the electromechanical device 260 may include a server 240 arranged for remote access to the electrical control system 1 and/or a data archive 245. For example, the server is set up to view optical sensors, to set parameters, times, etc., and the digital data archive is designed to store trends of environmental sensors, videos generated by the use of optical sensors, etc.

Advantageously, the electrical control system 1, by means of a suitable command received, can supply the power supply of the electrical power supply line SL, via a dedicated connection line 208, to an electronic device 265, 290 external to the electrical control system 1, for example any household appliance present in the home or a generic light supply, from any of the electronic devices 200, 205, 215, 220, 230, 235, or the electromechanical device 260.

In addition, any of the electronic devices 200, 205, 215, 220, 230, 235, 290, or the electromechanical device 260 can be used as a repeater of a signal containing a predetermined protocol or an internet protocol, or it can be used for transmitting or receiving control signals from/to any of the electronic devices 200, 205, 215, 220, 230, 235, 290 or the electromechanical device 260 connected to said electrical power supply line SL or external electrical power supply line ESL, or from/to any remote electronic device 285 including a communication circuit 106 adapted to transmit or receive radio frequency signals via an antenna A, or with an electronic device 265 or 290 external to the control system 1.

The control signal containing information transmitted through a predetermined protocol or an internet protocol, such that the receiving electronic device can interpret said received command signal so as to perform a predetermined function, for example it can switch on or off such electronic devices 265, 290, or carry out a particular function also through such electronic devices 265, 290 external to the control system 1.

In this way, a dimming system of the lights, external to the control system 1, is conveniently obtained by sending, for example, a command signal to a dimmable power supply 290, which converts the received information into a value to be applied, for example, to the current to be supplied to a generic light or a LED device 295.

The use of electronic devices as repeaters creates a very important function that allows communication between very distant electronic devices, or on different floors connected by stairs, or even in environments with very thick walls that prevent the optimal transmission of the radio frequency signal, also reducing the internal consumption of the system due to the transmissions.

Furthermore, the transmission of the internet protocol within the electrical control system 1 implements a totally integrated system.

Various aspects and embodiments of an electrical control system according to the invention have been described. It is understood that each embodiment may be combined with any other embodiment.

The principle of the invention remaining the same, embodiments and construction details may be varied with respect to those described and illustrated by way of non-limiting example, without thereby departing from the scope of the invention as described herein.

What is claimed is:

1. An electrical control system, in particular for home automation systems, comprising at least one electronic switching device, which includes a switching module;
   said switching module comprising:
   a switching circuit including at least one controlled switch arranged to allow a selective implementation of a switch configuration or a diverter configuration or an inverter configuration; and
   a plurality of terminals arranged to allow connection of said switching module to an external electrical system;
   said switching module being arranged to allow the selective implementation of the switch configuration of the switching circuit or diverter configuration of the switching circuit or inverter configuration of the switching circuit to said terminals, in a partial way, or total way, or so as to implement a total separation to said terminals,
   wherein the electronic switching device is used:
   as a repeater of a signal containing a predetermined protocol or an internet protocol; or for transmitting control signals to or receiving control signals from any remote electronic device including a communication circuit adapted to transmit or receive radio frequency signals via an antenna, or for transmitting control signals to or receiving control signals from an electronic device external to the control electrical system, the control signals containing information transmitted through a predetermined protocol or an internet protocol, such that the receiving electronic device can interpret said received command signal to perform a predetermined function.

2. The electrical control system of claim 1, wherein said at least one electronic switching device is intended to be fixed in a recessed seat arranged in a boundary wall of an environment, wherein the external electrical system extends in the recessed seat.

3. The electrical control system of claim 1, further comprising an electronic electrical separation device connected to an external electrical power supply line and to an electrical power supply line; the electronic device for electrical separation being arranged to allow separation of said electrical power supply line from said external electrical power supply line in a manual or automatic mode.

4. The electrical control system of claim 1, further comprising an electronic electrical connection device which is intended to be fixed in a recessed seat arranged in a boundary wall of an environment; an electrical power supply line extending in the recessed seat;
   said electronic device for electrical connection being arranged to allow installation of a generic electrical outlet and comprising at least one controlled switch arranged to allow an electrical connection between said electrical power supply line and a conductor of said electrical outlet.

5. The electrical control system of claim 1, further comprising an electromechanical device comprising a solenoid valve or an electric pump controlled by a control circuit or directly by an electrical power supply line; said electromechanical device permitting passage of a fluid through a conduit.

6. The electrical control system of claim 1, further comprising an electronic energy transfer device which includes an electrical circuit for transferring energy by usage of air as a transport means.

7. The electrical control system of claim 1, further comprising an electronic fingerprint detection device which includes a sensor for detecting fingerprints.

8. The electrical control system of claim 1, further comprising an electronic control device which includes a viewing system arranged to allow a user to control or manage the electrical control system.

9. The electrical control system of claim 1, further comprising an electronic sound device which includes a microphone or a speaker.

10. The electrical control system of claim 1, wherein the electronic switching device includes a supporting hollow body comprising a tub-like containing portion, which defines a cavity having a front opening in a plane essentially parallel and close to a boundary wall; the supporting hollow body allowing fixing of said device in the recessed seat arranged in said boundary wall of an environment by means of screws or fixing bodies.

11. The electrical control system of claim 1, wherein the electronic switching device includes a sensor for detecting light in a visible spectrum or in an ultraviolet spectrum or in an infrared spectrum, or includes a crepuscular sensor for controlling the light level.

12. The electrical control system of claim 1, wherein the electronic switching device includes a sensor for sensing ambient temperature or a sensor for sensing environmental humidity or a sensor for sensing at least one gaseous substance.

13. The electrical control system of claim 1, wherein the electronic switching device, which is connected to an electrical power supply line or an external electrical power supply line, includes:
   a control unit arranged to operate said electronic switching device;
   a voltage monitoring circuit arranged to detect passage of the voltage of the electrical power supply line or external electrical power supply line to the zero crossing point; the voltage monitoring circuit generating a signal towards the control unit;

or, as an alternative to the voltage monitoring circuit, said electronic switching device connected to said electrical power supply line or external electrical power supply line, includes:

a current monitoring circuit arranged to detect passage of the current of the electrical power supply line or external electrical power supply line to the zero crossing point; the current monitoring circuit generating a signal towards the control unit.

14. The electrical control system of claim 1, wherein the electronic switching device includes a power supply module comprising an input intended to be connected to an electrical power supply line or an external electrical power supply line; the power supply module having at least one DC voltage output.

15. The electrical control system of claim 1, wherein the electronic switching device includes a data communication circuit arranged to transmit or receive data through an electrical power supply line or an external electrical power supply line, or to transmit or receive radio frequency signals via an antenna.

16. The electrical control system of claim 1, wherein the electronic switching device is connected to a data transfer network directly or via a generic electric data connection device by at least one conductive cable or at least one optic fiber or a communication circuit arranged to transmit or receive radio frequency signals via an antenna.

17. The electrical control system of claim 1, wherein the electronic switching device includes a server to remotely access said electrical control system.

18. The electrical control system of claim 1, wherein the electronic switching device includes a data archive.

19. The electrical control system of claim 1, wherein the electronic switching device provides an electrical power supply line to an electronic device external to the electrical control system through a dedicated connection line by a received command signal.

* * * * *